United States Patent [19]

Su et al.

[11] Patent Number: 5,018,849
[45] Date of Patent: May 28, 1991

[54] COLORED CONTACT LENS AND METHODS OF MAKING THE SAME

[75] Inventors: Kai C. Su, Alpharetta; Jeanne S. Stevens-Crowe, Duluth, both of Ga.

[73] Assignee: Ciba-Geigy Corporation, Ardsley, N.Y.

[21] Appl. No.: 272,113

[22] Filed: Nov. 16, 1988

[51] Int. Cl.⁵ .............................................. G02C 7/04
[52] U.S. Cl. ................................. 351/162; 351/177
[58] Field of Search ............ 351/160 H, 160 R, 161, 351/162, 177

[56] References Cited

U.S. PATENT DOCUMENTS

| | | | |
|---|---|---|---|
| D. 211,757 | 7/1968 | Urbach | D57/1 |
| 3,454,332 | 11/1966 | Siegel | 351/162 |
| 3,536,386 | 10/1970 | Spivack | 351/160 R |
| 3,557,261 | 1/1967 | Wichterle | 264/1 |
| 3,679,504 | 7/1972 | Wichterle | 156/62 |
| 3,712,718 | 1/1973 | LeGrand et al. | 351/160 R |
| 4,208,362 | 6/1980 | Deichert et al. | 264/1 |
| 4,252,421 | 2/1981 | Foley, Jr. | 351/162 |
| 4,460,523 | 7/1984 | Neefe | 264/1.9 |
| 4,472,327 | 9/1984 | Neefe | 264/1.9 |
| 4,558,931 | 12/1985 | Fuhrman | 351/160 H |
| 4,559,059 | 12/1985 | Su | 9/507 |
| 4,582,402 | 4/1986 | Knapp | 351/162 |
| 4,615,593 | 10/1986 | Neefe | 351/162 |
| 4,638,025 | 1/1987 | Fuhrman | 524/40 |
| 4,639,105 | 1/1987 | Neefe | 351/162 |
| 4,640,805 | 2/1987 | Neefe | 351/162 X |
| 4,657,363 | 4/1987 | Neefe | 351/162 |
| 4,669,834 | 6/1987 | Richter | 351/162 |
| 4,681,412 | 7/1987 | Lemelson | 351/162 |
| 4,701,038 | 10/1987 | Neefe | 351/162 |
| 4,702,574 | 10/1987 | Bawa | 351/162 |
| 4,704,017 | 11/1987 | Knapp | 351/177 |
| 4,710,326 | 12/1987 | Neefe | 264/1.7 |

FOREIGN PATENT DOCUMENTS

| | | | |
|---|---|---|---|
| 710230 | 5/1965 | Canada | 8/3 |
| 815956 | 6/1969 | Canada | 18/121 |
| 0127450 | 5/1984 | European Pat. Off. . | |
| 0158999 | 4/1985 | European Pat. Off. . | |
| 0272101 | 6/1988 | European Pat. Off. . | |
| 62926 | 7/1968 | Fed. Rep. of Germany | 351/162 |
| 699736 | 11/1953 | United Kingdom | 351/162 |
| 8303480 | 4/1983 | World Int. Prop. O. . | |
| 83-03480 | 10/1983 | World Int. Prop. O. | 351/162 |

OTHER PUBLICATIONS

Crews, J., et al; "Management of Monocular Polyopia Using an Artificial Iris Contact Lens"; *Jour. of Am. Optometric Assoc.; vol. 59, No. 2; Feb. 1988; pp. 140-142.*
Contacto, vol. 12, No. 1, pp. 56-59, Mar. 1968.
Opticion, undated, by Chris Kerr entitled, "An 'Opaque' Tinted Soft Lens".

*Primary Examiner*—Scott J. Sugarman
*Attorney, Agent, or Firm*—Wenderoth, Lind & Ponack

[57] ABSTRACT

A contact lens capable of causing significant changes in the color of the iris of the eye of a wearer has a first portion contacting the eye, a second portion attached to the first portion and having an upper surface capable of being tinted, and an iris portion located between the first and second portions for masking the color of the iris. The iris portion reduces or otherwise alters the reflection color of the eye and mimics the structure of the natural iris so that the tinted color becomes the dominant color when the lens is worn.

10 Claims, 1 Drawing Sheet

COLORED CONTACT LENS AND METHODS OF MAKING THE SAME

BACKGROUND OF THE INVENTION

The present invention relates to coloring, shading or tinting contact lenses and, more particularly, relates to a lens structure having an interior opaque iris section for partially obscuring, at a minimum, the color of the natural iris of the wearer's eye and a pigmented portion located on the front surface of the lens for providing an appearance of color to the iris portion. Other aspects of the invention relate to methods of manufacturing such a lens.

Recently, there has been a great deal of interest in contact lenses which change or otherwise alter the color of the iris of the wearer's eye. In attempts to meet this demand, various lens structures have been proposed. For example, U.S. Pat. Nos. 3,557,261 and 3,679,504 to Wichterle et al. discloses a method for manufacturing contact lenses having a colored pattern enclosed between at least two layers of soft, transparent hydrogel material. U.S. Pat. No. 3,536,386 to Spivack also shows an imprinted portion sandwiched between two layers of lens material for creating the appearance of alternative eye color. U.S. Pat. No. 4 460 523 to Neefe discloses a method of making contact lenses which change eye color by employing small light reflecting particles imbedded in a colored transparent matrix. Canadian Patent No. 710,230 to Rich and U.S. Pat. No. 4,559,059 to Su disclose lenses having tinting on their front surfaces. Other patents relating to this area are U.S. Pat. No. 4,582,402 to Knapp, and U.S. Pat. Nos. 4,472,327; 4,615,593 and 4,701,038, all to Neefe.

The above examples and other known tinted contact lenses suffer from a substantial drawback. While such lenses are capable of enhancing existing eye color or changing the color of light-colored eyes, they are incapable of causing significant color changes. For example, it is difficult to change a natural dark brown eye color to pale blue using presently known lenses, because the lighter blue pigments cannot mask the darker, brown pigments. As a result, a desired color change is often impossible to achieve. Also, previous attempts at masking or changing the natural iris color have resulted in a flat, unnatural appearance of the eyes when the contact lenses are worn.

Furthermore, it is common practice for lenses to be tinted by the manufacturer and merely fitted by the local practitioner. As a result, the choice of colors available to the wearer is subject to the manufacturer's choice of product and is limited by the ability of the practitioner to maintain an inventory of a large number of lenses having an array of colors.

There exists a need, therefore, for a natural looking contact lens capable of causing significant changes in the appearance of the eye color of the wearer, and, more particularly, changing a dark eye color to a lighter color.

There also exists a need for such a contact lens which can be tinted by the local practitioner at the point of sale.

There exists a further need for a method of producing such a lens which is inexpensive and efficient.

SUMMARY OF THE PRESENT INVENTION

The present invention relates to a contact lens capable of producing significant change in the color of the eye of the wearer.

The present contact lens has a "sandwich" construction comprising a first lens portion and a second lens portion. While it is preferred that the lens be made of a hydrophilic or "soft" contact lens material, any type of lens material may be used. The first lens portion has a rear, concave base curve. Deposited on the top surface of the first lens portion are means for masking at least partially the iris. The masking means may take any form which results in reducing or otherwise altering the original reflective color of the eye. Preferably, the masking means has a pattern formed thereon of a plurality of lines which converge toward a transparent pupillary section. The second clear lens portion includes a front curve on its upper surface and is joined along its rear surface by polymerization to the top surface of the first lens portion. It is preferable that the iris portion be composed of mica. The front curve of the second lens portion may then be colored or tinted with any desirable color by a conventional process.

This lens construction will cause a significant change in the wearer's eye color as, for example, from dark brown to pale blue, by partially masking the wearer's natural iris color so that the tinted color becomes the dominant color when the lens is worn. The sandwiched iris portion of the lens also results in a more three-dimensional, and hence a more natural, look of the tinted lens.

Furthermore, untinted lenses with their respective masked iris portions may be provided to the practitioner, who then may color the lenses as desired at the point of final sale. This allows the practitioner to sell lenses of virtually any color without having to maintain a large, expensive inventory.

DETAILED DESCRIPTION OF THE PRESENT INVENTION

Figure 2:
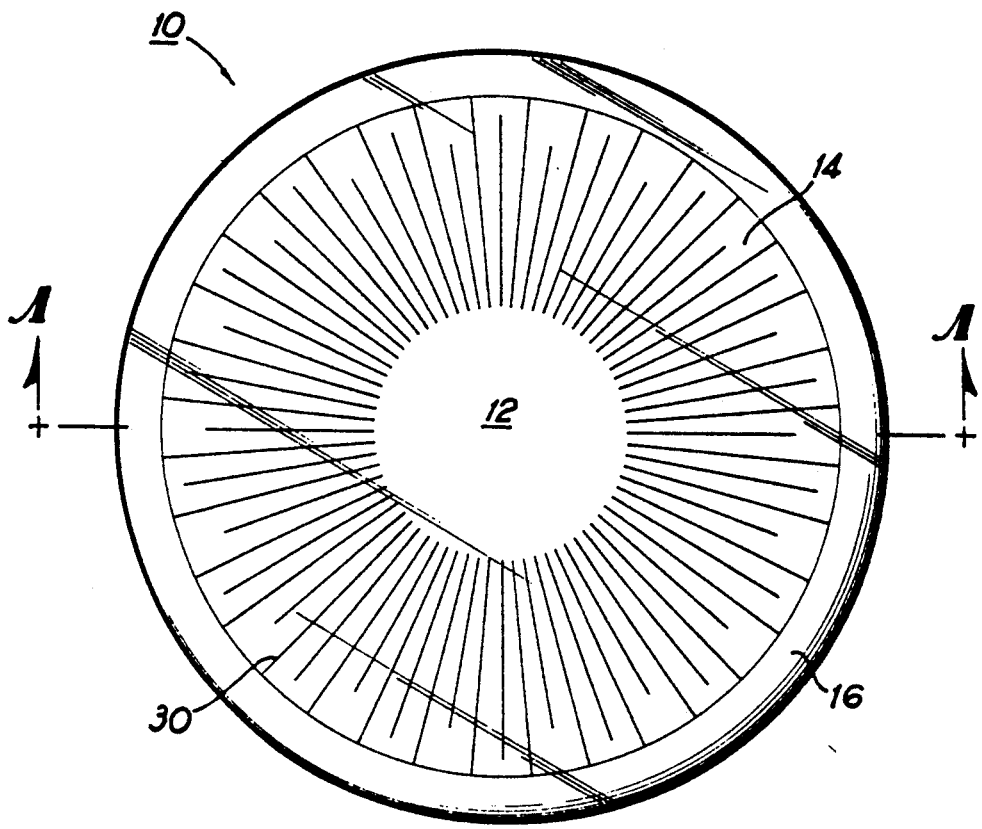
FIG. 2 is a top view of a contact lens of the present invention.
Figure 1:
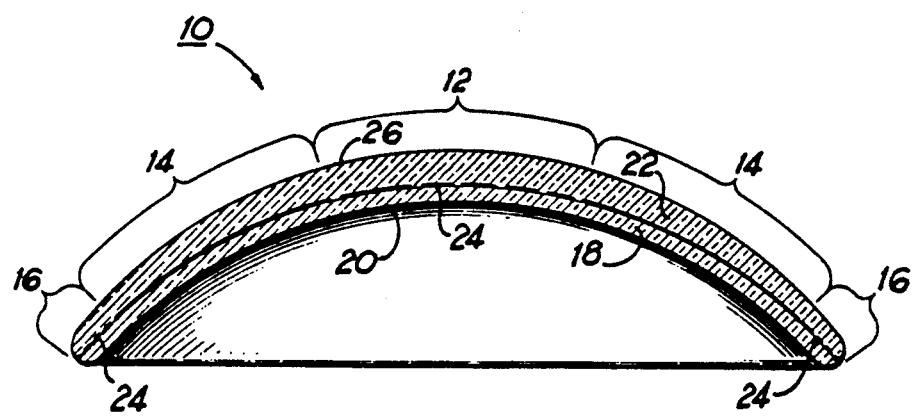
FIG. 1 is a sectional view of a contact lens of the present invention taken along line 1—1 in FIG. 2.

The contact lenses of the present invention are shaped like traditional contact lenses, having a concave rear surface adapted to be worn against the cornea and a convex front surface. Referring to FIGS. 1 and 2, the lens 10 has a transparent optical zone or pupil portion 12, and an iris portion 14 surrounding the pupil portion 12. The iris portion 14 is a replica of the human iris. The portions 12,14 are located on the lens 10 in such a way as to cover the underlying pupil and iris of the eye of the wearer. The diameter of the visible iris of a human usually falls between 10.5 and 13.5 mm; the pupil portion 12 typically has a diameter of approximately 4.0 to 5.0 mm. A transparent peripheral portion 16 may optionally be provided on the lens 10 in surrounding relationship to the iris portion 14.

As seen in FIG. 1. the lens 10 has a conventional "sandwich" construction comprising a first clear lens portion 18 with a rear base curve 20 and a second clear lens portion 22 having a front curve on its upper surface 26. The lens portions 18,22 have complimentary shapes.

The lens portion 18 has a top face opposite to the rear base curve 20 along which portions 18,22 are joined together, as indicated by dotted line 24. The joining of the portions 18,22 may be accomplished by any suitable means, including, for example, bondingly polymerizing or cementing the portions 18,22 together.

To produce the iris portion 14, an iris masking section 28 is placed between the first portion 18 and the second portion 22. The iris masking section 28 is preferably circular in shape and is positioned in such a manner as to cover the natural iris of the eye of the wearer when the pupil portion 12 of the lens 10 is over the pupil.

It is preferable that the iris masking section 28 be soft, pliable and oxygen permeable and translucent and, most preferably, have an off-white color. For example, the masking composition may be a biocompatible ink having as its basis mica or some other opaquing material. One formulation for an opaque ink usable in the present invention comprises a mixture of approximately 13.0 grams of Green #1 dye, 1.0 grams of White #1 dye, 11.0 grams of a binder and 19.44 grams of a solvent. However, other masking compositions, including translucent materials, may be used so long as they reduce or otherwise alter the original reflection color of the eye.

The masking section 28 may be painted, sprayed or printed on the top face of the first portion 18 or on a mold surface during the lens fabrication process. A very thin, opaque disk may also be used which is inserted between the lens portions 18,22 prior to their being bonded together. A pattern formed from a plurality of lines 30 converging towards the pupil portion 12, as best seen in FIG. 2, may be provided on the iris masking section 28 for creating the look of a natural iris. The pupil portion 12 is in registry with the pupil of the eye of the wearer when the lens 10 is worn on the eye.

To complete the iris portion 14, the upper surface 26 of the second portion 22 is tinted. This tinting can be of any desirable color, and can be performed by a conventional surface tinting process such as set forth in U.S. Pat. No. 4,559,059 to Su and incorporated herein.

It should be apparent, therefore, that the resulting lens 10 will be a multi-layered structure having the iris masking section 28 enclosed within the body of the lens 10 for obscuring the natural iris of the wearer from view and for providing an off-white or otherwise color altering backdrop to bring out the optimal colors of the upper surface 26 tinting, regardless of the color of the wearer's natural iris. The spacing between the tinted upper surface 26 and the masking section 28 creates a three-dimensional, and hence more natural, appearance to the lens 10.

The lens 10 may be manufactured in a variety of ways. One suggested method is a molded process, wherein the first portion 18 is produced in a mold. The iris masking portion 28 is stamped or otherwise placed onto the first portion 18, and lens material monomer is placed over the first portion 18. The monomer is then cured to produce the second portion 22 fused to the first portion 18 and enclosing the masking portion 28. The lens is then processed according to standard procedures. Standard lathe-cutting methods may also be used.

The lens 10 having the iris masking section 28 can then be tinted at the manufacturing facility, or can be provided to the practitioner who can tint the lens 10 as he wishes.

It can be seen that the present invention provides a lens capable of producing a significant color change to the eye of the wearer while also providing a natural looking iris.

What is claimed is:

1. A contact lens capable of at least partially obscuring the natural color of the iris of the eye of a wearer, comprising:
    a) a first lens portion having a rear base curve for contacting the eye of a wearer and an opposite top face;
    b) a second lens portion having an upper surface that is tinted with a tinting composition for providing the appearance of a desired color to the iris of the eye of the wearer and a curved rear surface which is complementary in shape to said top face of the first lens portion, said first and second lens portions being joined together along said top face of the first lens portion and said curved rear surface of the second lens portion; and
    c) means for obscuring at least partially the natural color of the iris of the eye of the wearer located between said first lens portion and said second lens portion said means being substantially translucent and substantially white and being in registry with the iris of the eye of the wearer when the contact lens is worn by the wearer said means aiding in obscuring the natural color of the iris of the eye of the wearer, the portion of said contact lens which is in registry with the pupil of the eye of the wearer when the contact lens is worn being transparent.

2. The contact lens of claim 1 wherein said means is on the top face of said first lens portion and comprises a pattern of the iris comprising a plurality of lines which convey toward the pupil portion of said contact lens.

3. The contact lens of claim 1, wherein said means is comprised of a composition containing mica.

4. The contact lens of claim 1, wherein said means is oxygen permeable.

5. The contact lens of claim 1, wherein said means is pliable.

6. The contact lens of claim 1, wherein said means is composed of a biocompatible material.

7. The contact lens of claim 1, wherein said first lens portion and said second lens portion are comprised of hydrophilic material.

8. A method for producing a contact lens capable of being tinted for changing the reflective color of the iris of the eye of a wearer which comprises:
    (a) placing means for obscuring at least partially the natural color of the iris of the eye of a wearer between a first lens portion and a second lens portion, said first lens portion having a rear base curve for contacting the eye of a wearer and an opposite top face,
    said second lens portion having an upper surface that is capable of being tinted and a curved rear surface which is complementary in shape to said top face of the first lens portion,
    said means being placed on the top face of said first lens portion or on the curved rear surface of said second lens portion in registry with the iris of the eye of the wearer when the contact lens is worn by the wearer,
    the areas of said first and second lens portions in registry with the pupil of the eye of the wearer when the contact lens is worn being free of said means, said means being substantially translucent and substantially white, (b) joining the said curved rear surface of the second lens portion to said top face of the first lens portion to form said contact lens having said means between said first lens portion and said second lens portion, and (c) tinting the upper surface of said second lens portion with a tinting composition for providing the appearance of a desired color to the iris of the eye of the wearer.

9. The method of claim 8, wherein said means is formed on said top face of the first lens portion by painting, spraying or printing.

10. The method of claim 8 wherein said means is independently formed and is then applied to said top face of the first lens portion.

* * * * *